United States Patent [19]
Mulligan et al.

[11] Patent Number: 5,937,161
[45] Date of Patent: Aug. 10, 1999

[54] ELECTRONIC MESSAGE FORWARDING SYSTEM

[75] Inventors: Geoffrey C. Mulligan; Scott Chasin; John W. Street; Mary M. Beazley, all of Colorado Springs, Colo.

[73] Assignee: USA.NET, Inc., Colorado Springs, Colo.

[21] Appl. No.: 08/635,248

[22] Filed: Apr. 12, 1996

[51] Int. Cl.[6] .......................... H04L 12/00; G06F 15/16
[52] U.S. Cl. .............................. 395/200.36; 395/200.68; 379/93.24; 379/100.08; 340/825.44
[58] Field of Search ................ 395/200.36, 200.68, 395/200.73, 200.75; 379/93.01, 93.15, 93.24, 100.01, 100.08; 340/825.44; 455/412, 417

[56] References Cited

U.S. PATENT DOCUMENTS

| | | | |
|---|---|---|---|
| 5,138,653 | 8/1992 | Le Clercq | 379/93.24 |
| 5,281,962 | 1/1994 | Vanden Heuvel et al. | 340/825.44 |
| 5,283,856 | 2/1994 | Gross et al. | 395/200.36 |
| 5,333,152 | 7/1994 | Wilber | 395/200.36 |
| 5,333,266 | 7/1994 | Boaz et al. | 395/200.36 |
| 5,377,354 | 12/1994 | Scannell et al. | 395/673 |
| 5,381,527 | 1/1995 | Inniss et al. | 395/200.69 |
| 5,406,557 | 4/1995 | Baudoin | 395/200.36 |
| 5,428,663 | 6/1995 | Grimes et al. | 340/825.44 |
| 5,436,960 | 7/1995 | Campana, Jr. et al. | 455/412 |
| 5,455,572 | 10/1995 | Cannon et al. | 340/825.44 |
| 5,479,408 | 12/1995 | Will | 340/825.44 |
| 5,479,411 | 12/1995 | Klein | 379/88 |
| 5,483,466 | 1/1996 | Kawahara et al. | 395/200.36 |
| 5,487,100 | 1/1996 | Kane | 340/825.44 |
| 5,495,234 | 2/1996 | Capp et al. | 340/825.44 |
| 5,513,126 | 4/1996 | Harkins et al. | 395/200.36 |
| 5,555,346 | 9/1996 | Gross et al. | 395/51 |
| 5,608,786 | 3/1997 | Gordon | 379/100.08 |
| 5,627,764 | 5/1997 | Schultzman et al. | 395/200.37 |
| 5,635,918 | 6/1997 | Tett | 340/825.44 |
| 5,647,002 | 7/1997 | Brunson | 379/93.24 |

FOREIGN PATENT DOCUMENTS 0 413 537 A2  8/1990  European Pat. Off. .

OTHER PUBLICATIONS

Gareiss, R., "A Value–Added Service With Brains", *AT&T technology*, vol. 10, No. 1, Jan. 1995.

Craigie, J., "ISO 10021–X.400(88): A Tutorial for Those Familiar with X400(84)", *Computer Networks and ISDN Systems*, vol. 16, No. 1/02, Sep. 1988.

Miller, J.G. et al, "Accessing Messages Your Way", *AT&T Technology*, vol. 10, No. 1, Spring 1995.

*Primary Examiner*—Eric W. Stamber

[57] ABSTRACT

A telecommunications system (100) includes a service provider node (116) that is capable of forwarding electronic mail messages addressed to a user of the service provider node. The forwarding process is controlled by a message transfer agent (202), a subscriber database analyzer (204), a queue directory (206), and a message queue agent (208). The subscriber database analyzer performs a comparison between data that the user has provided and the message content. The subscriber database causes the message queue agent to forward the message to a user-defined telecommunications address based upon the message content and the results of the comparison.

12 Claims, 2 Drawing Sheets

ELECTRONIC MESSAGE FORWARDING SYSTEM

BACKGROUND OF THE INVENTION

1. Field of the Invention

The present invention pertains to the field of method and apparatus for forwarding electronic messages from one telecommunications address to another telecommunications address. More specifically, the forwarding system is capable of forwarding the messages to a selected one of a plurality of addresses based upon user-defined data forwarding parameters.

2. Statement of the Problem

Recent advances in telecommunications networks have drastically altered the manner in which people interact and conduct business. These advances promote efficiency and convenience in one's ability to receive important information. For example, a businessman or salesman can be equipped with a cellular telephone and a laptop computer. The laptop computer can be connected to a portable facsimile machine or programmed with facsimile software that permits the salesman to send and receive telefacsimile messages while traveling across town or between different cities. Similarly, an executive on vacation or a business trip can use a computer system equipped with a modem to send and receive electronic mail messages that communicate important information.

Persons who enjoy the benefit of sending and receiving electronic messages typically subscribe to a telecommunications service that is associated with a particular telecommunications address. Thus, the telecommunications address is unique to a central service provider. Examples of telecommunications addresses that are unique to a central service provider include pager numbers and electronic mail addresses. The uniqueness of an address to a selected provider is often apparent on the face of the address, e.g., an electronic mail address of John Doe<jdoe@provider1.com>.

A user or subscriber to a particular telecommunications service may from time to time desire or need to change service providers (e.g., from doe@provider1.com to jdoe@provider2.com>). Exemplary motivation for these changes may derive from the fact that an alternative service provider charges lower rates, or the existing provider's inability to upgrade its service.

A user who desires to change central service providers suddenly faces the reality of being bound to the old service provider because the user's address is unique to that one provider. A sudden and complete changeover is in many circumstances impossible because the community of people who wish to send electronic messages to the user are only aware that the old address exists. For example, an electronic mail address or pager number may be published in an industry directory that is only published once every year or two years. Thus, the user incurs a potentially significant loss of prospective business by abandoning the old address.

Some service providers offer their user-subscribers the option of a message forwarding service. These forwarding services operate by receiving the incoming message, retrieving the portion of the incoming message that identifies a selected user who subscribes to the forwarding service, associating the selected user with a forwarding address through the use of a lookup table, and transmitting the message to the forwarding address. The forwarding services differ from the normal message delivery service that the central service provider offers because a portion of the forwarding address belongs to another central service provider. Thus, the forwarded message is actually delivered to its intended recipient by the other or second service provider, i.e., the forwarded message passes through two central service providers, as opposed to just one provider. The intended message recipient is free to change the second provider with regularity provided that the recipient always informs the forwarding service of each change in the second provider.

Existing message forwarding and placement services are rudimentary, and often fail to meet the complete needs of the user community. Problems arise when an intended message recipient is not physically present at a location where the message is finally delivered or where the message can be received.

The intended message recipient is often unaware that a message has actually arrived, and may not posses the wherewithal to obtain the message on a timely basis. The parties in communication also lose control of critical information. For example, a businessperson who splits his or her time about equally between offices in the respective States of Colorado and Florida may receive a message (e.g., a time-sensitive order for commercial goods) that resides on a computer system in the Colorado office during the businessperson's six month sojourn in Florida. Similarly, the businessperson may instruct his or her Boston office to deliver a confidential document by telefacsimile to a telephone number in Los Angeles by 4:00 pm on a given day. The parties are dismayed when the confidential document arrives in Los Angeles for all the world to see because the telefacsimile is sent after 7:00 pm Boston time (4:00 Los Angeles time) after the businessperson left Los Angeles. In another instance, the businessperson may be driving on a trip that will take him or her through two states and five designated local service areas for cellular telephone service. The businessperson's office may be trying to reach him or her with a message to abort the trip, but cannot do so because the office is unaware of the route.

Existing electronic message forwarding systems exacerbate the types of problems mentioned above because they are automatons that simply receive one type or class of message and forward that one message to one alternative address. For example, a central service provider's electronic mail forwarding service forwards only electronic mail messages. Additionally, it only forwards the messages to one address at another service provider. Thus, forwarding services are not presently capable of sending a different class of message to inform the intended recipient that a message is being sent, e.g., as by paging a man in Paris to inform him that an electronic mail message awaits him at an office in Zurich. Similarly, where a sender addresses an electronic mail message to a network server that is physically located in Boston, forwarding services are presently incapable of forwarding the message to a server in Los Angeles if the message is transmitted to the service provider between the hours of 8:00 and 11:30 am, and forwarding the message to a server in New York between the hours of 11:31 am and 9:00 pm.

There remains a true need for a method and apparatus capable of forwarding electronic messages or alerting people to the existence of electronic messages based upon user defined parameters, such as the time that the message is received, the content of the message, the address of the sender, and variable addresses of the intended message recipient.

SOLUTION

The present invention overcomes the problems identified above and advances the art by providing method and apparatus for forwarding electronic messages based upon user-defined parameters, such as the time that the message is received, the content of the message, the address of the sender, and variable addresses of the intended message recipient. The method and apparatus advantageously facilitates communications between different parties by providing flexible options as to message delivery addresses, and is even capable of converting a message that originates as one type or class of message into another appropriate class of message for delivery to the intended recipient.

The present invention is one in which a system receives an incoming message signal at a first telecommunications address, and forwards a corresponding message or signal to a second telecommunications address. As used herein, the term "address" refers to a physical location corresponding to a portion of an electrical or electromagnetic signal that a telecommunications system conventionally uses to route delivery of the signal to the physical location. The incoming message signal includes a plurality of data parameters. As used herein, the term "data parameters" includes data fields and subportions of data fields that are transmitted as corresponding electrical or electromagnetic signals according to conventional message transfer protocols. A list of data parameters at least includes a telecommunications address, as well as the body of a message appended to the telecommunications address, information about the sender of the message, and other information associated with the message.

When the incoming message signal arrives at the host system of a central telecommunications service provider, a program feature that is referred to herein as a message transfer agent stores an electronic copy of the message in a queue directory, and copies at least a portion of the incoming message for transfer to a subscriber database analyzer. The intended message recipient is allowed access to the subscriber database for the purpose of identifying selected data parameters that are used as data forwarding parameters. The user is also permitted to enter specific key word information that the subscriber database analyzer uses to associate a particular value of a data forwarding parameter with a user-defined telecommunications forwarding address. The subscriber database analyzer provides a message queue agent with the associated user-defined telecommunications address, and the message queue agent transmits a signal corresponding to the stopped message to the user-defined telecommunications address identified by the subscriber database analyzer.

The user or subscriber programs the subscriber database with a plurality of data fields representing telecommunications forwarding or delivery addresses. The user is able to enter information that the subscriber database analyzer associates with information in a selected data parameter (i.e., a user-selected data forwarding parameter) of the incoming message to identify a corresponding message forwarding or delivery address. The subscriber database analyzer is also capable of associating the incoming information content of the data forwarding parameter with a plurality of telecommunications forwarding or delivery addresses, in which case the subscriber database analyzer causes the message queue agent to transmit a plurality of message signals corresponding to the incoming message signal. This plurality of message signals includes, for example, the transmission of an electronic mail signal together with a pager message alerting the intended recipient that the electronic mail signal has been transmitted. The subscriber database analyzer is also capable of forwarding messages based upon a plurality of user-defined time intervals that are each associated with a user-defined forwarding address or a plurality of forwarding addresses. In the most preferred embodiments, the subscriber database analyzer parses the incoming message text for selected key words that the database analyzer associates with a user-defined forwarding address or a plurality of forwarding addresses.

The database analyzer is capable of forwarding the message in a data format that is compatible with a plurality of delivery destination technologies. For example, the database analyzer can convert a digital electronic mail message into a bitmap image for telefacsimile transmission, or a voice message for delivery to a telephone answering machine addrress.

Other salient features, objects, and advantages will be apparent to those skilled in the art upon a reading of the discussion below in combination with the accompanying drawings.

DETAILED DESCRIPTION OF THE PREFERRED EMBODIMENT

The telecommunications system

Figure 1:
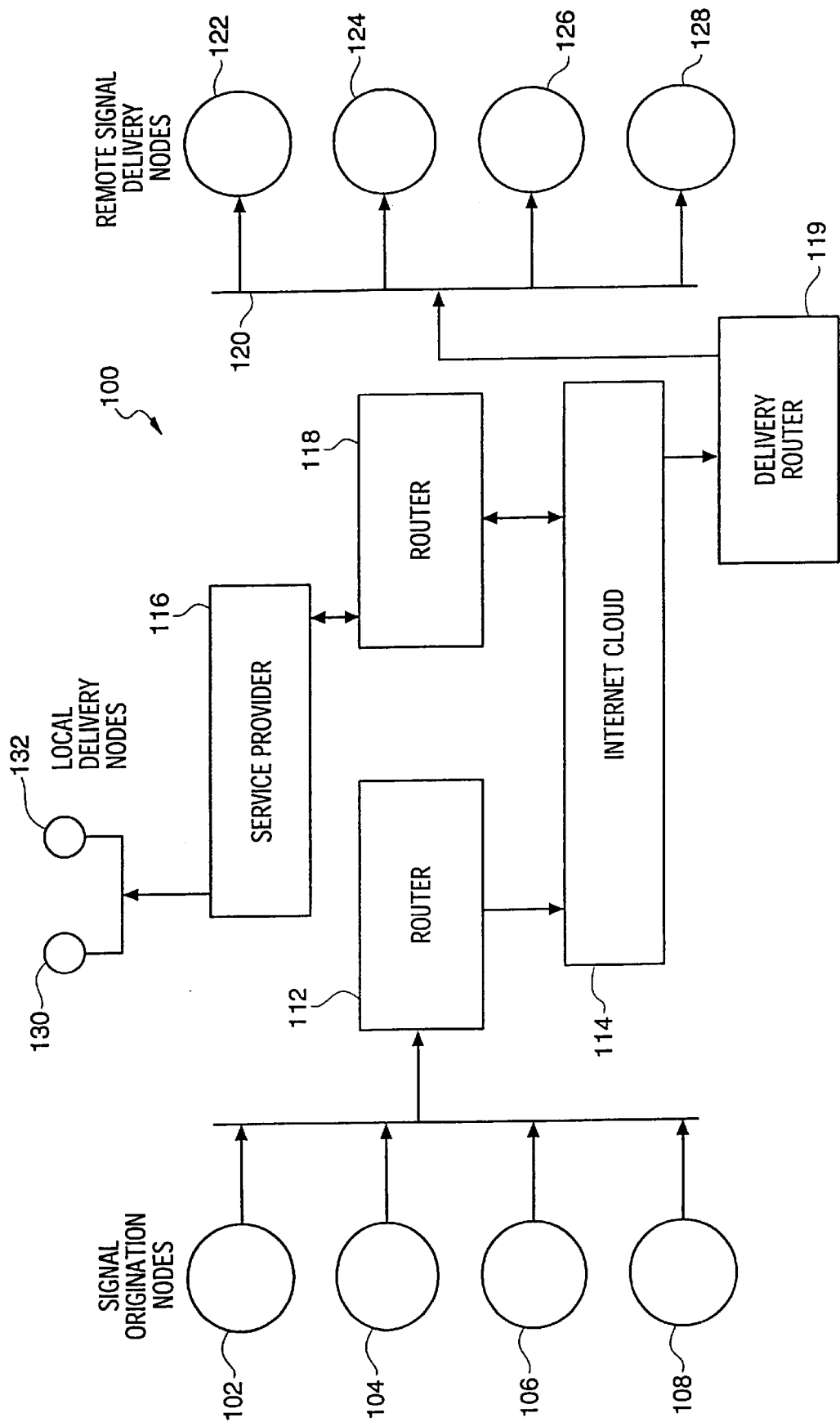
FIG. 1 depicts a telecommunications system that is accessed by a service provider according to the present invention.

FIG. 1 schematically depicts a conventional INTERNET telecommunications system 100. The FIG. 1 system is exemplary in nature. The present invention can be implemented as program control features on substantially all telecommunications service provider systems, and system 100 is intended to represent any operable telecommunications system that is used by any telecommunications service provider in conducting communication operations.

Telecommunications system 100 includes a plurality of user or signal origination nodes, namely, signal origination nodes 102, 104, 106, and 108, each of which corresponds to a telecommunications address. A single city or local service area may have millions of these signal origination nodes. Nodes 102–106 correspond to telecommunications addresses that belong to individuals, businesses, and other entities having need to avail themselves of telecommunications services.

Each one of nodes 102–108 feeds its signal (addressed to a subscriber identified at a selected service provider) to a local router node 112 that directs the local signal to a relay system, e.g., the INTERNET cloud 114, which transmits the signal to router 118 through a series of relays. The signal eventually arrives at service provider 116 from router 118. Service provider system 116 provides additional addressing information to the signal there received, and reroutes the signal through router 118 to INTERNET cloud 114 (or an equivalent relay system) to delivery router node 119. In turn, delivery router node 119 routes the signal to a selected one of user signal delivery nodes 122, 124, 126, and 128, corresponding to a telecommunications address provided by service provider 116. Alternatively, service provider 116 directly routes the message signal to local delivery nodes 130 and 132.

As indicated above, FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention.

The Service Provider System

In the most preferred embodiment, the service provider system 116 is an INTERNET service provider system, as depicted in FIG. 1. The term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Figure 2:
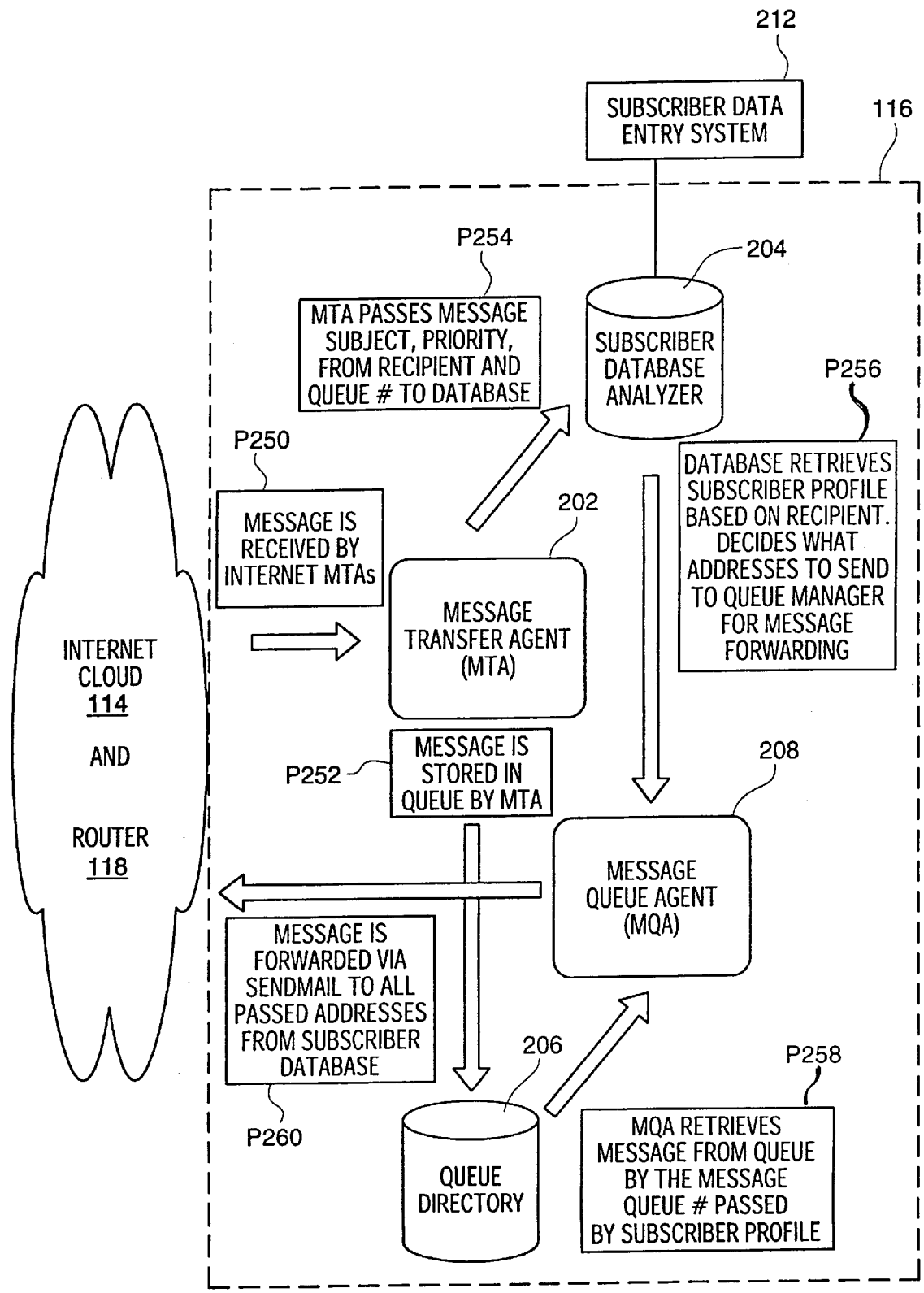
FIG. 2 depicts a control system according to the present invention.

FIG. 2 depicts the features and operation of a service provider system 116 (surrounded by a dashed line). System 116 is a computer system that receives incoming electronic message signals, stores copies of the message signals, uses data contained in the message signals to associate the signals with a forwarding or delivery address, and transmits the message signals to the forwarding or delivery address. System 116 is comprised of various program control features that interact with operably connected hardware to provide the message forwarding function. The various program control features or subsystems of system 116 include a message transfer agent 202 (random access memory and program logic), a subscriber database analyzer 204 (random access memory, a magnetic storage medium containing an information database, and program logic), a queue storage directory 206 (an electromagnetic storage medium), and a message queue agent 208 (random access memory and program logic). System 116 is operably connected through router 118 to the INTERNET cloud 114 to signal origination nodes 102–108 and signal delivery nodes 122–128 of telecommunications system 100 or any equivalent system to that depicted in FIG. 1.

The operation of system 116 begins in step P250 with the receipt of an incoming message signal routed through telecommunications system 100 from a signal origination address, e.g., address 104, when message transfer agent 202 receives the incoming signal.

In step P252, message transfer agent 202 accesses queue directory 206 to store the incoming electronic message that it has received.

In step P254, message transfer agent 202 identifies the type of incoming message, and processes the message for transmission to subscriber database analyzer 204. The message processing includes retrieval of selected portions of the incoming message for transmission to subscriber database analyzer 204. These selected portions correspond to data fields of the message that are referred to herein as possible data forwarding parameters.

In the most preferred embodiment, message transfer agent 202 is programed to retrieve possible data forwarding parameters corresponding to the portions of an electronic mail message, as defined in appropriate SMTP electronic mail message protocols set forth in RFC 822, which is hereby incorporated by refrence herein to the same extent as though fully disclosed herein. The most preferred data forwarding parameters include the message subject field, the message priority field, the sender's address, the intended recipient's address, and the queue storage number used to identify the stored message in queue directory 206.

Message transfer agent 202 is optionally provided with the capability of converting textual messages to voice messages and voice messages to textual messages. For example, if the incoming message is a telefacsimile, message transfer agent 202 can use commercially available optical character recognition software, e.g., Calera's Wordscan or Xerox's Text Bridge, to convert the image into text (ignoring translation errors) into an electronic mail message by inserting ASCII characters into the body of the message. Message transfer agent 202 optionally uses commercially available software, e.g., software available from Applied Language Technology of Cambridge, Mass., to convert text to voice or voice to text. In yet another option, message transfer agent 202 identifies the incoming message signal as a pager message signal, and transmits the recipient's pager address together with the senders return telephone number and any informational content of the message to subscriber database analyzer 204.

In step P256, database analyzer 204 accesses its corresponding electronic storage medium to retrieve data associated with the recipient's address that is identified in and obtained from the incoming message that is now stored in queue directory 206. The database can include a relational database, a hierarchical database, or a flat file stored as rows and columns of data keyed to the intended recipient's address on provider service 116. The commercially available Oracle relational database is especially preferred for use in the present invention.

The first action taken by subscriber database analyzer 204 is a lookup call to the database to determine if the party receiving the message exists in the subscriber database. If the user does not exist or has let the subscription lapse, the subscriber database analyzer appends a service code to the message indicating that the user is not in the system. Based upon this service code, the message is returned to the senders address together with a notation that the user does not exist on the system, or is no longer a user of the system.

When the user is a valid user, subscriber database analyzer 204 compares the selected portion of the incoming message provided by message transfer agent 202 against corresponding information keyed into the subscriber database through subscriber data entry system 212. Based upon the results of this comparison, the subscriber database analyzer appends a service code to the message indicating an appropriate action that needs to be taken in response to the message. The appropriate action corresponds to that which the user has entered to the system through subscriber data entry system 212. Examples of responsive actions taken by the subscriber database analyzer at the subscribers behest include actions taken on all messages originating from a list of specified users, actions taken on messages not originating from a specified list of users, actions taken on messages having a subject matter heading that includes specified key words, actions taken on messages not having a subject matter heading that includes specified key words, actions taken on messages having a priority less than a specified value, actions taken based upon the time or date the message is received, actions taken on messages having specified key words found in the body of the text, and combinations of these analyses or comparisons.

The subscriber database analyzer 204 uses stored data from subscriber data entry system 212 to associate the actions desired from subscriber database analyzer 204 with the results of the search analysis described in the preceding paragraph. As indicated by the subscriber, the result of any of the above-described comparisons is associated with a correspondingly desired action. These actions include deletion of the message, storing of the message on the service provider's system, and forwarding of the message to a user-specified address or a plurality of addresses. The subscriber can also request provider system 116 to send a pager signal to a particular telephone number indicating that a electronic mail message has arrived on the service provider system 116. The subscriber can additionally request the electronic mail message to be transcribed into a bit-map image for telefacsimile transmission to a selected telefacsimile number. The subscriber can also request that electronic mail messages be translated for output to a voice delivery system.

Examples of actions to be taken according to the subscriber's instructions include the deletion of all messages having a sender's address known to the subscriber as belonging an overzealous sales representative. In other instances, on a selected day, the user can request the forwarding of all messages received between the hours of 8:00 am and 1:00 pm to a server address located in Dallas, and all messages received later than 1:00 pm to a server located in Phoenix with corresponding hard copies of all messages received from 8:00 am onward being forwarded to a telefacsimile number in Phoenix. Similarly, the user can indicate to system 116 through subscriber data entry system 212 that only messages having a priority of "1" are forwarded to the server in Dallas, with the remainder being forwarded to the server in Phoenix.

If subscriber database analyzer 204 finds that no match exists based upon a comparison between the user-specified data forwarding parameters and the message content, the message is forwarded to a user-specified default delivery address. Alternatively, subscriber database analyzer 204 can simply delete or store the message. If the user has not entered a default delivery address into the system, the message is returned to the sender's address.

The message queue agent 208 receives signals form subscriber database analyzer 204 including an action service code, message queue number, and recipient's intended address. In step P258 Message queue 208 agent retrieves the message corresponding to the queue number from queue directory 206, identifies the type of message being sent, appends the recipient's intended address to the message. In step P260 forwards the message to the intended recipient through the INTERNET cloud 114 or other appropriate nodal relay system. The subscriber can also direct message queue agent 208, through database analyzer 204, to modify the message header information, e.g., the "RE:" line heading. Thus, the subscriber can add additional information, such as his or her name to the "RE:" line. Accordingly, the message is always deliverable to the intended subscriber-recipient when it arrives at a destination.

Those skilled in the art understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

We claim:

1. A system located at an internet service provider for use in forwarding electronic mail messages for delivery from one address to another address based upon user-defined parameters, said system comprising:

means located at an internet service provider for receiving an electronic mail message signal delivered to a first electronic mail address identified in said electronic mail message signal, said electronic mail message signal including a plurality of data parameters;

means located at said internet service provider responsive to receipt of said electronic mail message signal for storing said electronic mail message signal in a message queue to provide a stored message signal;

means for permitting a user of said internet service provider to enter data for selection of at least one of said plurality of data parameters as a data forwarding parameter;

means located at said internet service provider responsive to receipt of said electronic mail message signal for retrieving information content from said electronic mail message signal, said information content corresponding to said data forwarding parameter as a basis of comparison;

means located at said internet service provider for associating said information content with at least one selected electronic mail forwarding address by comparing said information content against a plurality of information content operations wherein each one of said information content options is associated with a corresponding electronic mail forwarding address;

means located at said internet service provider for producing a forward able message signal representative of said stored message signal; and means located at said internet service provider for forwarding said forward able message signal as electronic mail to said user at said electronic mail forwarding address.

2. The system as set forth in claim 1 wherein said associating means includes means for associating said information content with a plurality of electronic mail forwarding addresses, and said forwarding means includes means for forwarding a corresponding number of copies of said forward able message signal to said plurality of electronic mail forwarding addresses.

3. The system as set forth in claim 1 wherein said associating means includes means for selecting an address corresponding to said information content and a user-defined time interval.

4. The system as set forth in claim 1 wherein said permitting means includes means for deriving said information content from a plurality of said data forwarding parameters.

5. The system as set forth in claim 1 wherein said retrieving means includes means for parsing a body of said stored message signal to identify key words as said information content, and said associating means includes means for associating said information content with a first electronic mail forwarding address when a user-specified key word is present and for associating said information content with a second electronic mail forwarding address when said user-specified key word is not present.

6. The system as set forth in claim 1 including means for returning said electronic mail message signal to its sender if said electronic mail message signal fails to identify a subscriber to said system.

7. A method of forwarding electronic mail messages for delivery from one address to another address based upon user-defined parameters at a level of an internet service provider, said method comprising:

receiving an electronic mail message signal delivered to a first electronic mail address identified to an internet service provider, said electronic mail message signal including a plurality of data parameters;

storing said electronic mail message signal in a message queue located at said internet service provider to provide a stored message signal;

permitting a user of said internet service provider to enter data for selection of at least one of said plurality of data parameters as a data forwarding parameter;

retrieving at least a portion of said electronic mail message signal by said internet service provider to obtain information content corresponding to said data forwarding parameter;

associating said information content with at least one selected electronic mail forwarding address by said internet service provider comparing said information content against a plurality of information content options wherein each one of said information content options is associated with a corresponding electronic mail forwarding address;

producing a forward able message signal representative of said stored message signal by said internet service provider; and forwarding said forward able message signal by said internet service provider to said user at said electronic mail forwarding address.

8. The method as set forth in claim 7 wherein said associating step includes associating said information content with a plurality of electronic mail forwarding addresses, and said forwarding step includes forwarding a corresponding number of copies of said forward able message signal to said plurality of electronic mail forwarding addresses.

9. The method as set forth in claim 7 wherein said associating step includes a step of selecting an address corresponding to said information content and a user-defined time interval.

10. The method as set forth in claim 7 wherein said permitting step includes a step of deriving said information content from a plurality of said data forwarding parameters.

11. The method as set forth in claim 7 wherein said retrieving step includes a step of parsing a body of said stored message signal to identify key words as said information content and said associating step includes associating said information content with a first electronic mail address when a user specified key word is present and for associating said information content with a second electronic mail address when said user-specified key word is not present.

12. The method as set forth in claim 7 including a step of returning said electronic mail message signal to its sender if said electronic mail message signal fails to identify a subscriber to said system.

* * * * *